Patented July 3, 1928.

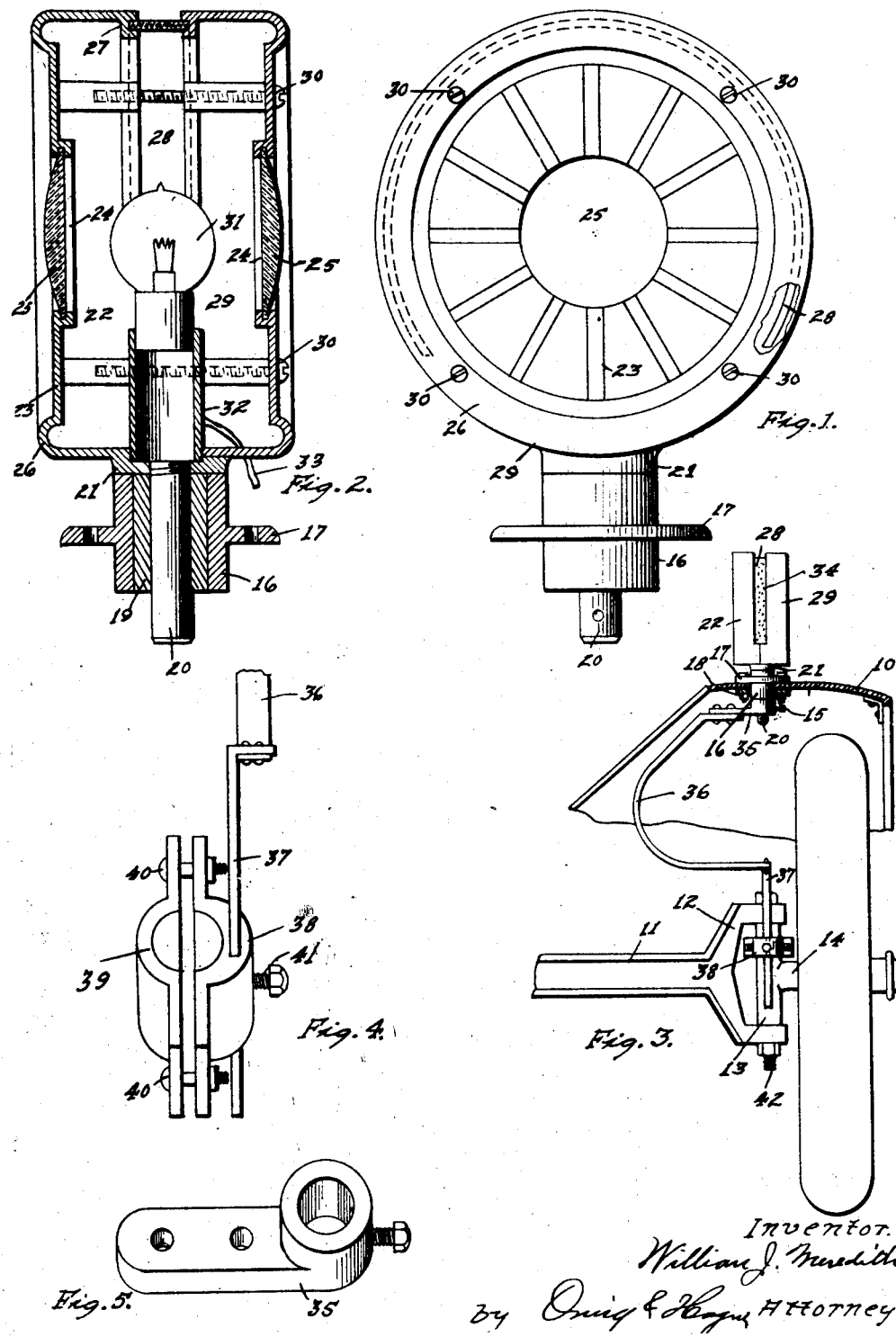

1,675,656

UNITED STATES PATENT OFFICE.

WILLIAM J. MEREDITH, OF NEWTON, IOWA.

WHEEL-ANGLE INDICATOR FOR AUTOMOBILES.

Application filed October 12, 1926. Serial No. 141,143.

The object of my invention is to provide means carried by the front fenders of an automobile for indicating to the driver the angularity of the front wheels relative to the automobile body, said indicating device being provided with means for illuminating the same.

A further object is to provide in connection with a wheel angle indicator designed to be carried by the automobile fenders and to be actuated through the wheel spindles, improved means for operatively connecting said indicator with the said wheel spindle, said means being adapted to permit free movement of the fender relative to the said spindle.

A further object is to provide a wheel angle indicator of simple, durable and inexpensive construction, which may be easily and quickly applied to various types of automobiles, and which is free from numerous pivoted or geared members to eliminate unnecessary noise.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved indicator.

Figure 2 is a vertical, transverse, sectional view of the same.

Figure 3 shows the manner in which my improved device is applied to an automobile, the fender being in section.

Figure 4 is a perspective view of the indicator operating mechanism.

Figure 5 is a perspective view of the crank arm for operating the indicator.

The numeral 10 indicates the front fender of an automobile, and 11 the front axle. Each end of which is provided with a spindle yoke 12, in which is pivotally mounted a spindle sleeve 13 supporting the wheel spindle 14. The spindle and its sleeve are provided with the usual steering mechanism which forms no part of my present invention, and for that reason is not illustrated.

The fender 10 is provided with an opening 15 located vertically above the pivot center of the spindle sleeve 13. Supported in the opening 15 is a collar 16 having a flange 17 which provides means for securing the collar rigidly to the fender 10 by means of suitable bolts or rivets 18. The collar 16 is provided with a sleeve 19 formed of antifriction material such as wood.

Rotatively mounted in the sleeve 19 is a shaft 20, the upper end of which is screw threaded and designed to support a hub 21. The said hub terminated in a cylinder casing 22, one end of said casing being provided with a disk 23 for closing the same. The central portion of the said disk is provided with an opening 24 in which is mounted a colored lens 25, said lens being mounted in the usual manner. The outer edge of the disk 23 is provided with a bead 16 substantially semi-circular in cross section, and for the purpose of representing the tire of an automobile wheel. The outer face of said disk is painted or inscribed to represent the felly and spokes of the wheel, while the lens 25 represent the hub portion.

The opposite or inner edge of the cylindrical casing 22 is provided with a semi-annular groove 27 for receiving a semi-cylindrical transparent member 28. Secured to the casing 22 is a similar casing 29 arranged in a reverse manner. The casing 29 is detachably secured to the casing 22 by means of suitable screws 30. The member 13 is preferably formed of semi-transparent material such as frosted glass or colored celluloid.

Thus it will be seen that by providing the casings 22 and 29, I have provided a lamp container in which is mounted an electric lamp 31 supported in the usual socket 32, said socket being secured in the lower end of the lamp casing. An electric conductor 33 is provided for illuminating the lamp, which may be carried through the storage battery in the usual manner.

By this arrangement it will be seen that the lamp casing is free to rotate about a vertical axis, which is in alinement with the axis of the wheel spindle. The member 28 is of such width that the inner edges of the casings 22 and 29 are supported apart a slight distance, so that a narrow slot 34 is provided between the edges of said casings, through which the light from the lamp 31 may be radiated, giving the effect of a narrow illuminated band, which may be clearly visible at night, said band being mounted in a plane parallel with the wheel carried by the spindle 14.

For causing the casing 29 to turn in unison with the said wheel, I have provided on the lower end of the shaft 20 a crank arm 35, which projects inwardly beneath the fender 10. The inner end of said crank is riveted to a U-shaped spring 36 formed of flattened steel. The ends of said spring project outwardly. The lower end of the spring 36 is rigidly secured to a vertically arranged clamping bar 37 slidably mounted in a semicircular clamping member 38 in the manner clearly shown in Figure 4. A similar clamping member 39 is provided which may be adjustably and detachably secured to either the upper or lower end of the spindle sleeve 13 by means of suitable bolts 40. The bar 37 is adjustably secured in the member 38 by means of a set screw 41.

By this arrangement it will be seen that the device may be easily and quickly attached to automobiles of various dimensions between the fender and the spindle 14, the difference in distance being easily adjusted by means of the set screw 41. The clamps 38 and 39 are mounted on the spindle sleeve in such a manner that the sleeve is free to rotate about the spindle bolt 42 in the usual manner, and when it so rotates the lamp casings 22 and 29 will be rotated in unison therewith, to thereby provide means whereby the illuminated member 28 will always be maintained in parallel relation with the wheel, and provides means whereby the angularity of said wheel may be at all times ascertained.

By providing the spring 36 of flattened sheet metal, I have provided means whereby the lamp casing may always be rotated in unison with the wheel and at the same time permit the fender to move freely toward and from the axles. By forming the spring of flattened steel sufficient rigidity will be provided for imparting rotary movement from said spindle wheel to said lamp casings without the use of complicated mechanism.

It will further be seen that I have provided a mechanism which is free of numerous moving pivoted parts, which usually work loose and become exceedingly noisy, and which may be easily and quickly attached without any expensive alteration to the car.

It will further be seen that by mounting the U-shaped spring 36 with its closed portion extending inwardly and away from the automobile wheel, I have provided means whereby a considerable clearance is provided between the wheel and the said spring member to prevent clogging with mud and trash which might get on the wheel.

I claim as my invention:

1. In combination, an automobile axle, a fender yieldably mounted to move toward and from said axle, said axle being provided with a spindle and a spindle sleeve pivotally mounted therein, a lamp casing pivotally mounted in said fender, means for imparting angular movement to said lamp casing in unison with the angular movement of said spindle, comprising a clamp detachably secured to said sleeve, a clamping bar adjustably mounted in said clamp, an arm secured to the lower end of the pivot of said lamp, and a U-shaped spring having one end secured to said clamping bar and its other end secured to said arm.

2. In combination, an automobile axle and a fender yieldably mounted to move toward and from said axle, a wheel spindle pivotally mounted in said axle, a flanged collar mounted in said fender having its opening in alinement with the pivot center of said spindle, a shaft rotatively mounted in said collar, a lamp casing secured to the upper end of said shaft, said lamp casing being provided with an illuminated direction-indicating device, a clamp detachably secured to said spindle, a clamp bar adjustably mounted in said clamp, and a U-shaped spring having one of its ends secured to said clamp bar and the other end secured to the lower end of said shaft.

3. In combination, an automobile axle and a fender, said axle being provided with a spindle and a spindle sleeve, said sleeve being pivotally mounted therein, a lamp casing secured to said fender and pivotally mounted in alinement with said spindle sleeve, said lamp being provided with an illuminated character to indicate direction, a U-shaped resilient member having its closed portion extending inwardly, one end of said U-shaped member being connected to the lamp pivot and the other end detachably connected to said spindle sleeve.

4. In combination with an automobile chassis having a front axle and a fender yieldably mounted to move toward and from said axle, said axle being provided with a spindle and a spindle sleeve, a wheel for said spindle, a lamp casing pivotally mounted to said fender and in alinement with said sleeve, said lamp casing being provided with a narrow slot mounted in parallel relation with the automobile wheel, resilient means connecting said sleeve with said lamp casing for imparting pivotal movement to said lamp casing, means for detachably connecting said resilient means to said spindle sleeve, and means for adjusting said resilient means with said clamping means.

Des Moines, Iowa, October 4, 1926.

WILLIAM J. MEREDITH.